United States Patent
Poreh et al.

[11] Patent Number: 5,903,269
[45] Date of Patent: May 11, 1999

[54] APPARATUS FOR AND METHOD OF ACQUIRING PROCESSING AND ROUTING DATA CONTAINED IN A GUI WINDOW

[75] Inventors: Illan Poreh, Havazelet-Hasharon; Avner Algom, Tel Aviv; Alexander Vaindiner, Or Akiva; Ilya Shpilberg, Netanya, all of Israel

[73] Assignee: Anysoft Ltd., Netanya, Israel

[21] Appl. No.: 08/627,519

[22] Filed: Apr. 4, 1996

Related U.S. Application Data

[63] Continuation-in-part of application No. 08/540,530, Oct. 10, 1995.

[51] Int. Cl.⁶ ............................................. G06F 15/00
[52] U.S. Cl. ........................................ 345/346; 345/340
[58] Field of Search ............................ 345/340, 326, 345/327, 328, 339, 341, 342, 343, 344, 345, 346, 347, 348, 349, 350, 351, 352, 400, 335, 330, 333, 332

[56] References Cited

U.S. PATENT DOCUMENTS

| | | | |
|---|---|---|---|
| 5,392,386 | 2/1995 | Chalas | 345/335 |
| 5,555,369 | 9/1996 | Menendez et al. | 345/340 |
| 5,579,469 | 11/1996 | Pike | 345/326 |
| 5,590,266 | 12/1996 | Carson et al. | 345/340 |
| 5,596,697 | 1/1997 | Foster et al. | 345/340 |
| 5,596,702 | 1/1997 | Stucka et al. | 345/340 |
| 5,598,524 | 1/1997 | Johnston, Jr. et al. | 345/348 |
| 5,619,637 | 4/1997 | Henshow et al. | 345/340 |
| 5,621,878 | 4/1997 | Owens et al. | 345/326 |
| 5,625,809 | 4/1997 | Dysart et al. | 345/614 |
| 5,634,095 | 5/1997 | Wang et al. | 345/326 |
| 5,638,505 | 6/1997 | Hemenway et al. | 345/348 |

*Primary Examiner*—Steven P. Sax
*Attorney, Agent, or Firm*—Paul J. Sutton

[57] ABSTRACT

An apparatus for and method of acquiring, processing and routing data contained in a graphical user interface window is described. The data contained in a window selected by the user is captured by an acquisition unit and stored in a data buffer. The data, whether string data or bitmapped graphics data, is stored in the data buffer in standard graphical user interface text and/or bitmap format. A user may mark a portion of the text or bitmap graphics contained in the selected window. The processed data is then routed to one or more output devices. Output devices may include, for example, files, printers, windows, electronic mail services and operating system temporary buffers. The method of acquiring and marking data in a selected window is disclosed.

6 Claims, 8 Drawing Sheets

APPARATUS FOR AND METHOD OF ACQUIRING PROCESSING AND ROUTING DATA CONTAINED IN A GUI WINDOW

REFERENCE TO RELATED APPLICATIONS

This application is a continuation in part of application Ser. No. 08/540,530, filed Oct. 10, 1995 Pending.

FIELD OF THE INVENTION

The present invention relates in general to the field of data management in a graphical user interface (GUI) operating system (OS) environment and more specifically, to capturing text and bitmaps from GUI window to a buffer, marking text within the GUI window and to routing data from the buffer to input/output devices or other applications and utilities for further processing.

BACKGROUND OF THE INVENTION

The majority of computer system users today work on computers running some type of GUI OS such as Windows 3.1, Windows 3.11 and Windows 95, developed by Microsoft Corp., Redmond, Washington and IBM OS/2, manufactured by IBM Corp., Armonk, N.Y. These operating systems are able to execute many application programs, including threads, at the same time (i.e. multitasking). These applications perform such specific tasks as word processing, database management, spreadsheet calculations, etc.

The above mentioned GUI oriented operating systems are all based on the concept of a window. The window is the basic unit of the GUI and the user interacts with applications Through one or more windows. Text and pictures (i.e. bitmaps) are among the basic units of information with which the user works while interacting with the GUI.

Applications can exchange data and control each other within the multitasking OS. There are several mechanisms of interprocess communications and data exchange within most modem operating systems. They include shared memory, the clipboard, application to application communication mechanism and data object linking and embedding services. These facilities share one major disadvantage: the application must have been designed and coded to specifically support any of these interprocess communications mechanisms.

The majority of these GUI operating systems today incorporate some form of temporary buffering facility, whereby data from one window may be cut or copied to a buffer (i.e. the clipboard in the Windows OS) and later pasted into another application. The use of this buffer is a simple and effective mechanism of getting data from one application into another, especially when the applications were not designed to work with each other. This mechanism allows applications from different vendors to share data without each knowing about the other. However, for this mechanism to function, the application itself must have been written to include the necessary cut, copy and paste functions for a user to exploit the temporary buffer mechanism (i.e. the clipboard in Windows). Unfortunately, there exist many applications that do not incorporate this mechanism to get data out of their window(s) and put it into the clipboard. Applications such as terminal emulators, data communication programs (i.e. modem and faxing programs), Internet access software, etc., generally do not supply a simple and easy mechanism to get data out of their programs and to route it to a destination.

Screen capture programs, well known in the prior art, offer an alternative to the clipboard for capturing window data, but they too suffer from disadvantages. Screen capture programs operate on the level of screen memory. They allow a user to capture any portion of the actual visible screen without regard to the type of data being displayed. Captured data is by necessity stored as bitmapped graphics data. It is impossible to capture a text portion of a screen corresponding to, for example, a word processor and store the captured data as text or string data (e.g., in ASCII format), without additional processing such as optical character recognition (OCR). Screen capture programs suffer from not being able to store the data they capture in the data's native format.

U.S. Pat. No. 5,392,386, issued to Chalas, teaches a system for adding functions to an existing application program executing in a computer system having a GUI that includes a clipboard. The system intercepts communications between the OS and the application program and determines when the user is invoking one of the added functions. The system sends captured information to the clipboard in response to user commands.

It is desirable to have a system for and a method of getting text and bitmaps data from any application running in system, without utilizing a clipboard, saving it in buffer and delivering it to any other application or output device.

Hereinafter, the term output device is defined as any hardware device, file, software application or other receptacle, existing either in hardware or software, that is able to receive data. The term standard graphic format is defined as any graphic format supported by the Windows operating system. The term standard text format is defined as the ASCII format widely used in today's PCs.

SUMMARY OF THE INVENTION

Accordingly, it is an object of the present invention to provide a system and method of capturing text in its intrinsic format (i.e. ASCII) from any substantial window belonging to an arbitrary application and storing the text for later use in a buffer (not the clipboard), whereby the arbitrary application need not support an application to application communication mechanism, data object linking and embedding services or clipboard operations such as cut, copy and paste.

It is another object of the present invention to provide a system and method of capturing bitmap images from any substantial window belonging to an arbitrary application and storing the bitmap image for later use in a buffer (not the clipboard), whereby the arbitrary application need not support an application to application communication mechanism, data object linking and embedding services or clipboard operations such as cut, copy and paste.

Yet another object of the present invention is to provide a system and method for marking text on any substantial window belonging to an arbitrary application using text already present in a buffer.

Another object of the present invention is to provide a system for delivering text and bitmaps, previously stored in a buffer, to other applications or output devices selected by the user.

There is therefore provided, in accordance with a preferred embodiment of the present invention, a method in a computer system of acquiring, processing and routing text and/or bitmap data contained in window, selected by a user, the method comprising the steps of acquiring the data, in native text and bitmap format, from a window, storing the acquired data in a data buffer, a processing the data stored in the data buffer in order to designate part of it, and routing the designated data to at least one output device, selected by the user.

In addition the step of acquiring comprises the steps of loading the application EXE module and associated dynamic link libraries (DLL) into memory, determining a window handle of the window selected by the user, installing at least one hook on a window procedure associated with the GUI window selected by the user, using window subclassing, installing at least one application programming interface function (API) hook on at least one native API function of the operating system, forcing the GUI window selected by the user to be redrawn thereby causing all text and/or bitmap data within the selected window to be sent to the selected window, filtering data and filling a text buffer with the text and/or bitmap data sent to the selected window.

The step of filling a text buffer and filtering data comprises forcing the selected window to redraw its contents, gaining control from the original window procedure pass to the subclassing procedure which resides in the DLL of the present invention, initializing the text buffer to a known state, utilizing the DLL of the present invention to capture and filter text and/or bitmap data redrawn to the selected window, saving it in the buffer, and returning control to original window procedure.

The step of capturing comprises temporarily removing the at least one API hook, copying data within the parameters of API functions to a temporary buffer for further processing, calling at least one original OS API function so as to draw the text and/or bitmap data on the selected window and reinstalling at least one API hook.

In addition, there is provided, in accordance with a preferred embodiment of the present invention, a method of processing and routing text data contained in window, selected by a user, the method comprising the steps retrieving succeeding cursor coordinates on selected window in subclassing procedure, determining text within the data buffer of the DLL of the present invention, positioned within these coordinates, drawing the text with a changed background color on the selected window and subsequently routing the designated text to one or more output devices.

In addition, there is provided, in accordance with a preferred embodiment of the present invention, a method of processing and routing bitmap data contained in window, selected by a user, the method comprising the steps retrieving cursor coordinates within the selected window in a subclassing procedure, determining bitmap coordinates within the data buffer of the present invention, drawing a frame rectangle around bitmap on the selected window and after that routing the designated bitmap to an output device.

BRIEF DESCRIPTION OF THE DRAWINGS

The invention is herein described, by way of example only, with reference to the accompanying drawings, wherein.

DETAILED DESCRIPTION OF THE INVENTION

The invention has been realized in a Windows application hereinafter referred to as ANY. Application ANY consists of main EXE module and a number of dynamic link library (DLL) modules, collectively referred to as the ANY DLL module. The ANY application resides in the memory of a computer.

Figure 1:
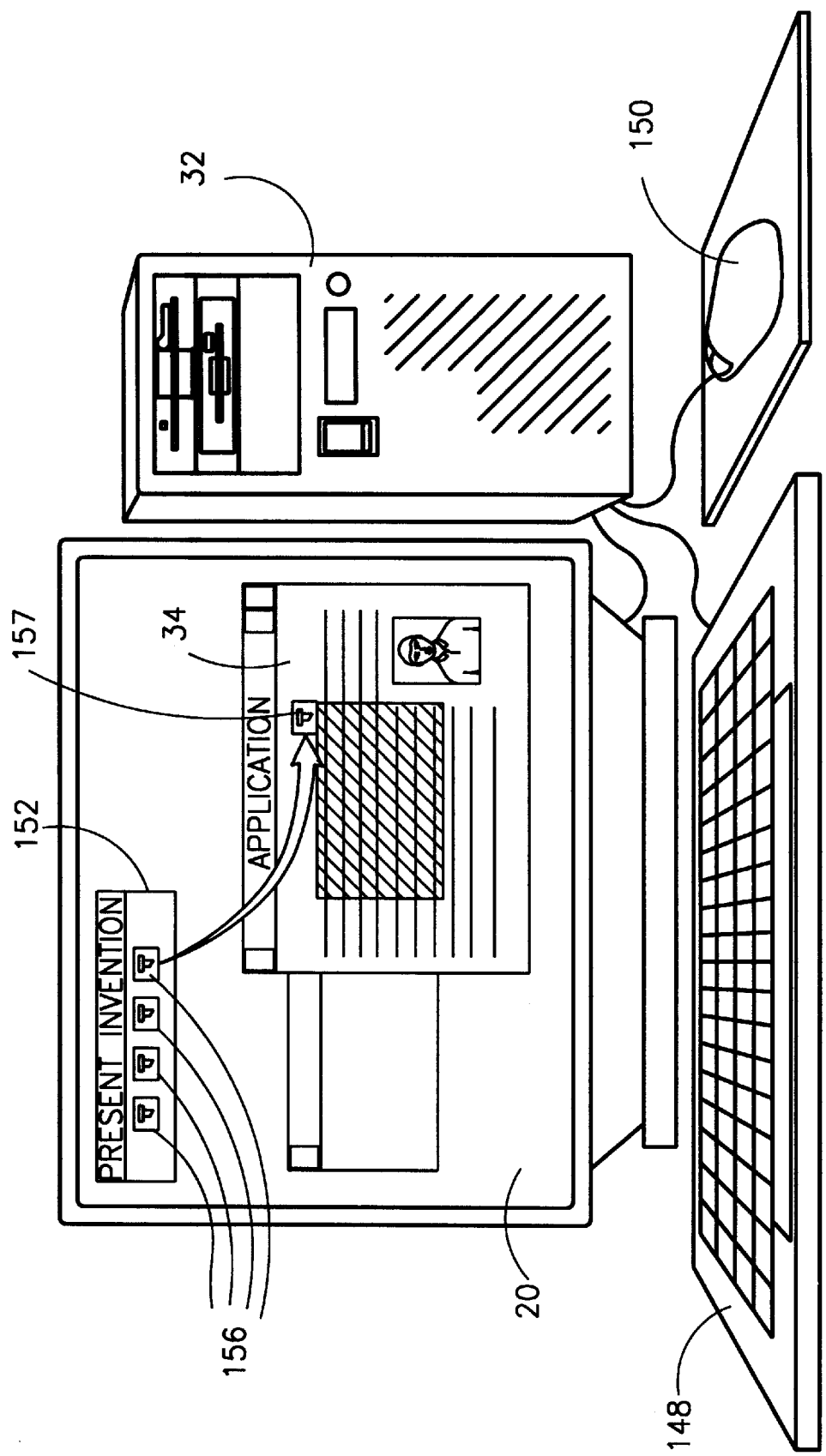
FIG. 1 illustrates a sample window of an application constructed in accordance with a preferred embodiment of the present invention as applied to an arbitrary application running in a GUI windowed environment on the computer system.

The present invention disclosed herein gives a computer user working in a windowed GUI environment the ability to acquire and route data contained in any substantial window visible on the screen, belonging to arbitrary application, regardless of whether the data is originally 'view only.' An example of the present invention in a typical application is shown in FIG. 1, to which reference is now made.

A typical computer system includes computer 32, mouse 150, keyboard 148 and video display or screen 20. In the example, computer 32 operates under the control of GUI operating system such as Windows 3.1, Windows for Workgroups 3.11 or Windows 95, for example. Shown within display 20 are a window 152 representing an application embodying the present invention and a window 34 associated with another arbitrary application. The application with window 34 may be any arbitrary application that is capable of drawing this window on screen 20. Window 152 embodying the present invention contains one or more icons 156 representing different user programmable command configurations.

Any substantial visible window can have its contents captured. Both text (i.e. string) data and bit mapped graphics data may be captured. To capture data in a window, a user drags one of the icons, such as icon 157, from window 152 and drops it in a window selected to be captured, such as window 34, for example. Both text data and graphics objects may be highlighted and designated by the user. The user can elect to route or output the selected data to one or more destinations such as a file, another window, graphic utility or electronic mail services (e-mail), for example.

Figure 2:
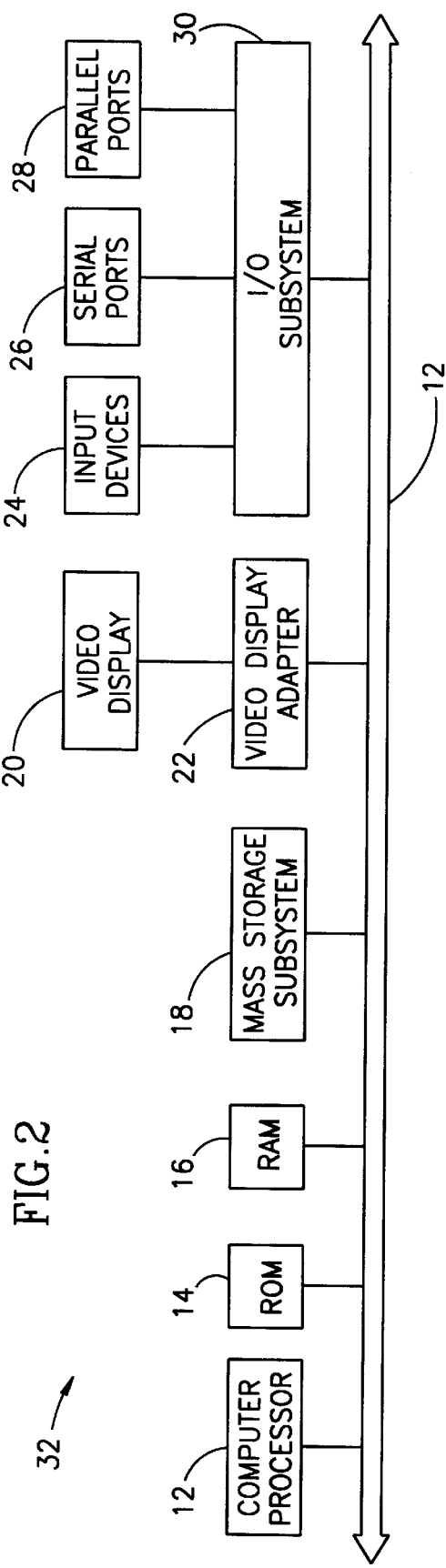
FIG. 2 is a high level block diagram of a computer processing system wherein the present invention may be employed.

Shown in FIG. 2 is a high level block diagram of a computer system 32 that can operate the present invention. Computer system 32 includes a computer processor 12 coupled to a bus 13. Also coupled to bus 13 are read only memory (ROM) 14, random access memory (RAM) 16, mass storage subsystem (hard disk) 18 video display adapter 22 and input/output (I/O) subsystem 30. Computer system 32 has at it's core computer central processor 12. ROM 14 contains firmware for computer processor 12. The firmware enables computer 32 to initialize, perform system tests, etc.

RAM 16 provides computer processor 12 with read/writeable memory in which to perform calculations and run application programs. Hard disk 18 provides computer 32 with long term memory storage capabilities for storing system and application related data. Video display adapter 22 provides computer 32 with the capability of displaying information on video display 20. I/O subsystem 30 provides an interface between computer processor and the outside world. Input devices 24 include keyboard and pointing devices, for example, and are connected to I/O subsystem 30. Pointing devices include mouse, trackballs, graphic tablets, etc. Serial ports 26 allow computer system 32 to communicate with serial devices such as modems. Parallel ports 28 allow computer system 32 to communicate with parallel devices such as printers. Bus 13 connects the internal components of the computer system 32 together and provides an internal means of communication between the components.

Figure 3:
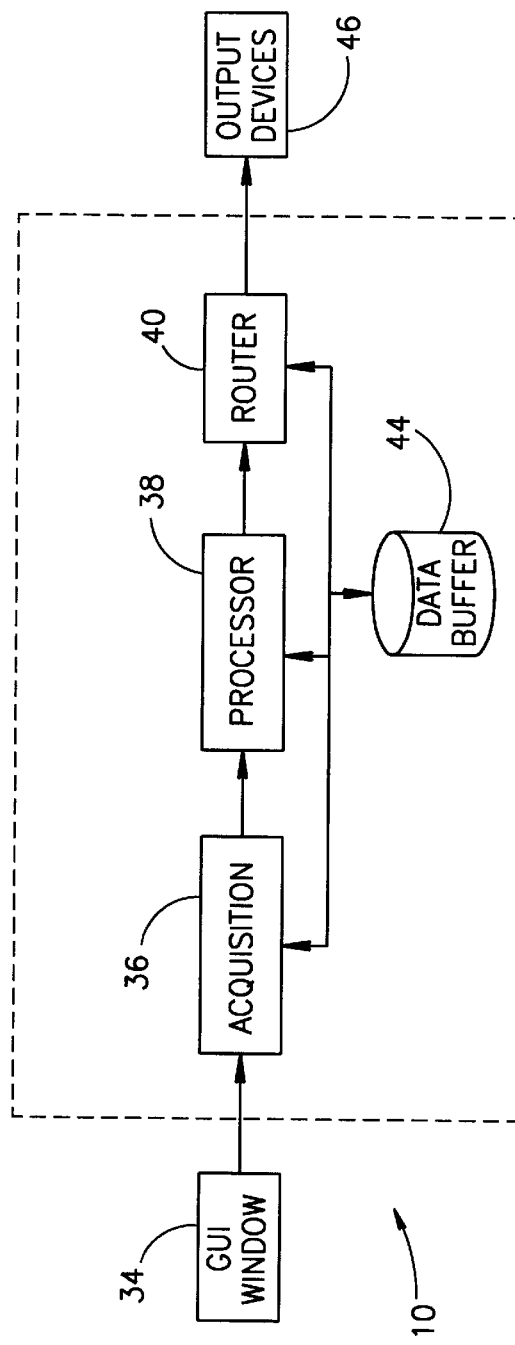
FIG. 3 is a high level block diagram of a preferred embodiment of the present invention.

A preferred embodiment of the present invention is shown in FIG. 3. The system or device of the present invention, generally referenced 10 (i.e., the ANY application), includes an acquisition unit 36 coupled to a data processor 38 and a data buffer 44. Data processor 38 is coupled to a router 40 and data buffer 44. Router 40 is also coupled to data buffer 44. Data from a GUI window 34 is captured by acquisition unit 36 and stored in data buffer 44. Data buffer 44 may reside wholly or in part either in RAM 16 or on hard disk 18. Data processor 38 functions to process the data stored in data buffer 44. Router 40 transmits processed data 38 to one or more output devices 46.

Figure 4:
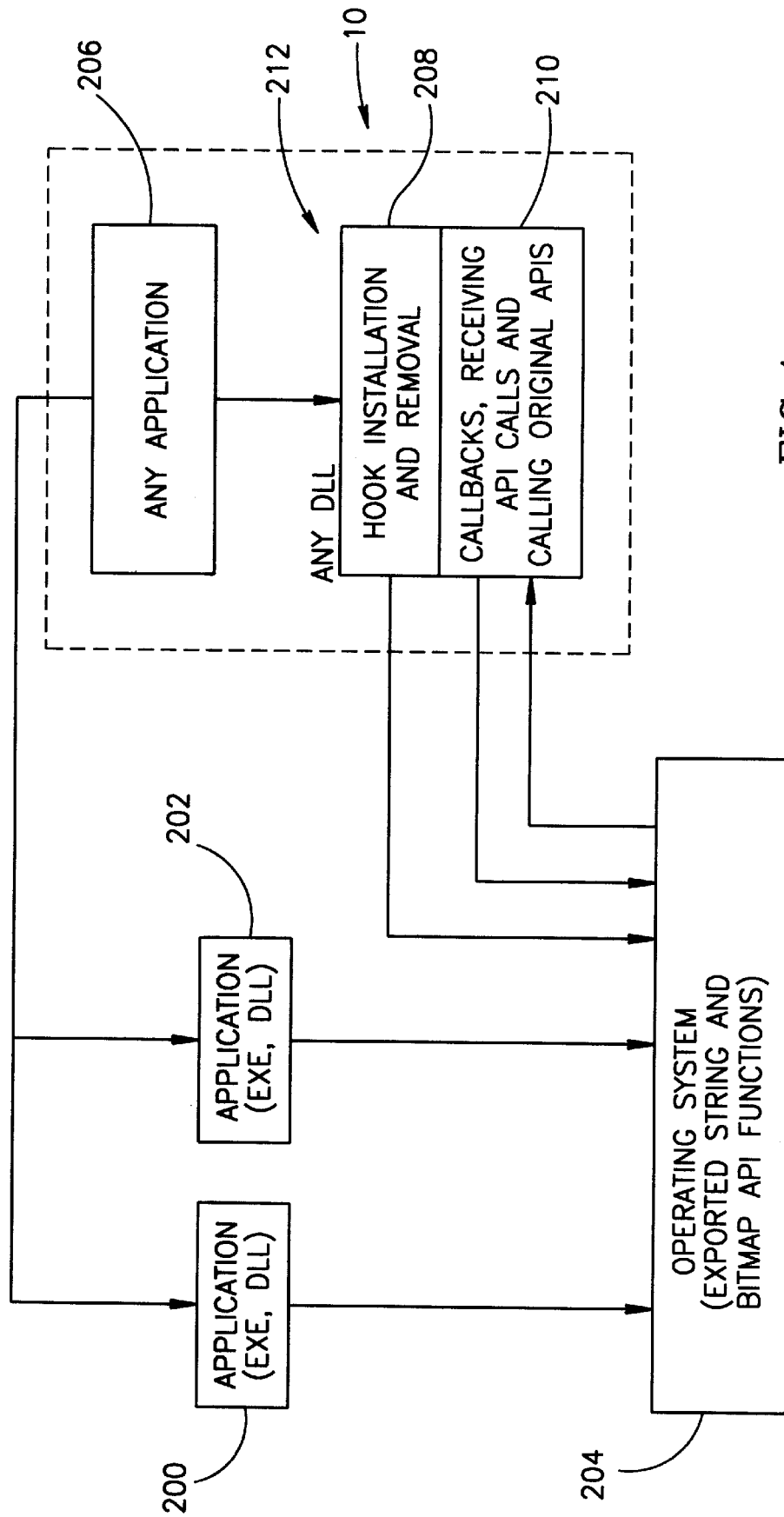
FIG. 4 is a high level block diagram illustrating the communications between the present invention, two arbitrary applications and a GUI operating system all of which reside in memory.

A high level block diagram illustrating the communications between the present invention, two arbitrary applications and a GUI operating system in memory is shown in FIG. 4. Conceptually illustrated are the basic components that communicate, which include applications, including the present invention and the operating system. In a preferred embodiment, operating system 204 is Windows 3.1, Windows 3.11 or Microsoft Windows 95. The memory layout illustrated in FIG. 4 includes data structures and programs or processes shown as rectangular boxes. Lines connecting boxes indicate that information is passed between the processes or data structures.

It is noted that FIG. 4 is merely a conceptual illustration used to show the data flow and communications between applications and the operating system within the memory. Other parts of the operating system not considered crucial for the present discussion are not depicted or discussed. It is also important to note that memory utilization is constantly changing throughout the course of application program execution. Data structures and application code are constantly being loaded and unloaded into and out of memory. In addition many different processes and data structures can be resident in memory at one time.

The modules of the operating system export application programming interface (API) functions (e.g., in the Windows 3.1/3.11 operating system: KERNEL.EXE, USER.EXE and GDI.EXE). Applications 200 and 202 are processes that perform a word processing, data base management or other specific task. These applications interact with the operating system by calls to API functions. The drawing and appearance of text and bitmaps in a GUI window are controlled by calls within an applications to the following OS GUI API functions.

| For text: | |
|---|---|
| TextOut: | writes a character string at the specified location |
| TabbedTextOut: | writes a tabbed character string |
| ExtTextOut: | writes a character string within a rectangular region |
| For bitmaps: | |
| | copies a bitmap from a specified device context to a destination device context |
| StretchBlt: | copies a bitmap, stretching or compressing the bitmap if necessary sets the bits of a bitmap to the values given in a device independent bitmap (DIB) specification |
| SetDIBitsToDevice: | sets bits from a DIB directly on a device surface |

Application ANY 206 is appropriately constructed to implement system 10. The EXE module of application ANY 206 loads its dynamic link library (DLL) ANY DLL 212 into memory.

To capture data in a GUI window, the present invention utilizes the function interception technique described in Finnegan J., "Hook and Monitor Any 16-bit Windows Function with Our ProcHook DLL," incorporated herein by reference. This technique allows any exported function call to be hooked, multiple times if required. The function hooking technique replaces an API function call with a callback function that is supplied in ANY DLL 212, and provides possibility after that to call the original function within callback, effectively chaining the API call. Thus the interception of API calls provides the principal mechanism to capture text and bitmap output into the window on screen of any arbitrary application running on the computer system.

In a preferred embodiment the hooking and capture mechanisms are realized in application ANY 206 which interoperates with applications 200, 202. Application ANY loads its associated DLL, ANY DLL 212. ANY DLL comprises a hook installation and removal component 208 and a callback function for receiving API calls and calling original API portion 210. ANY application 206 installs interception hooks using hook installation and removal portion 208, on API functions as previously mentioned. When application 200 or 202 calls API functions to draw text and/or bitmaps in one of their windows on the screen control is passed to a callback function in ANY DLL. 210. The callback function receives all the data which is to be drawn on the screen as parameters of API functions. After filtering the callback function, the parameter data is stored in an internal buffer. Interception hooks 208 are then removed and the original API functions are called from within the callback function 210 so as to actually get data drawn on the screen.

Figure 5:
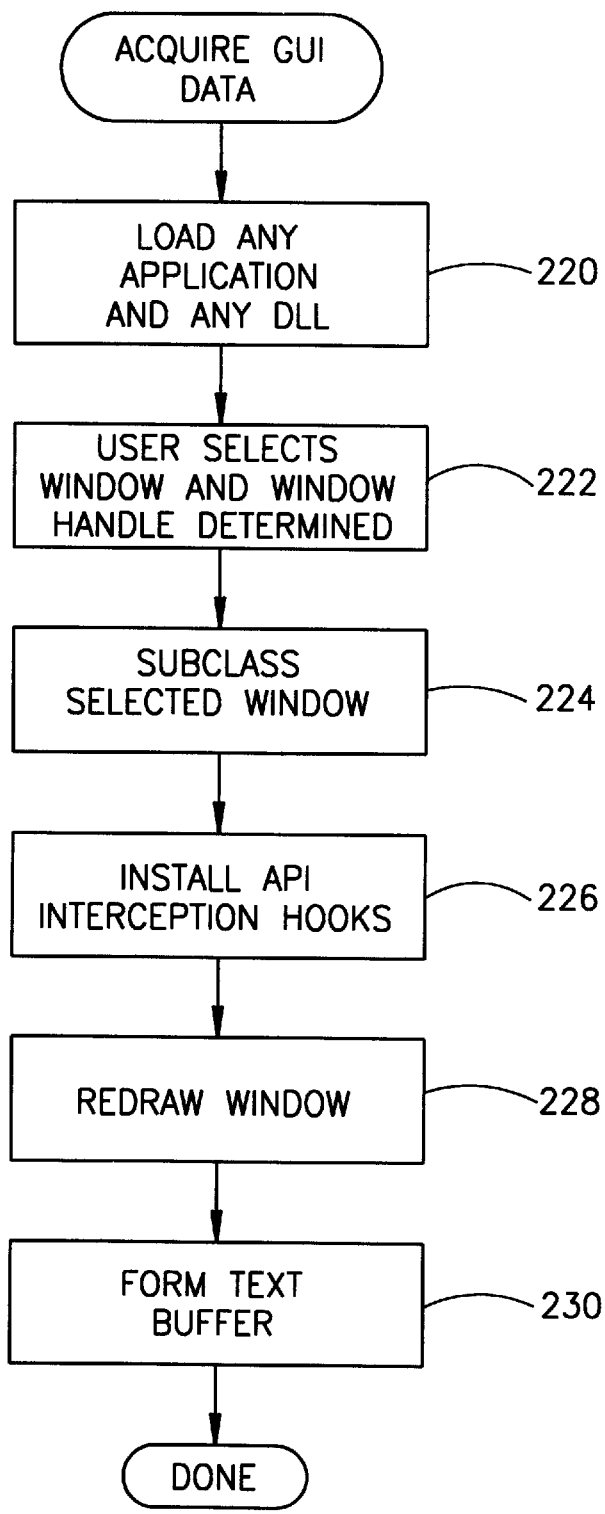
FIG. 5 is a high level flow diagram illustrating the method of acquiring data from an arbitrary application GUI window and storing it in a buffer.

A high level flow diagram illustrating the method of acquiring data from an arbitrary application GUI window and storing it in a buffer is shown in FIG. 5. Shown in FIG. 5 are only the principle steps needed, not shown are the steps in connection with the initialization and de-initialization of resources, which are well known to those skilled in art. Application ANY is loaded and activated by a user, working in a Windows environment, by clicking on an appropriate icon within Program Manager or from the command line (step 220). Then the user selects a window which contains text and/or bitmaps to be captured. (step 222).

Figure 6:
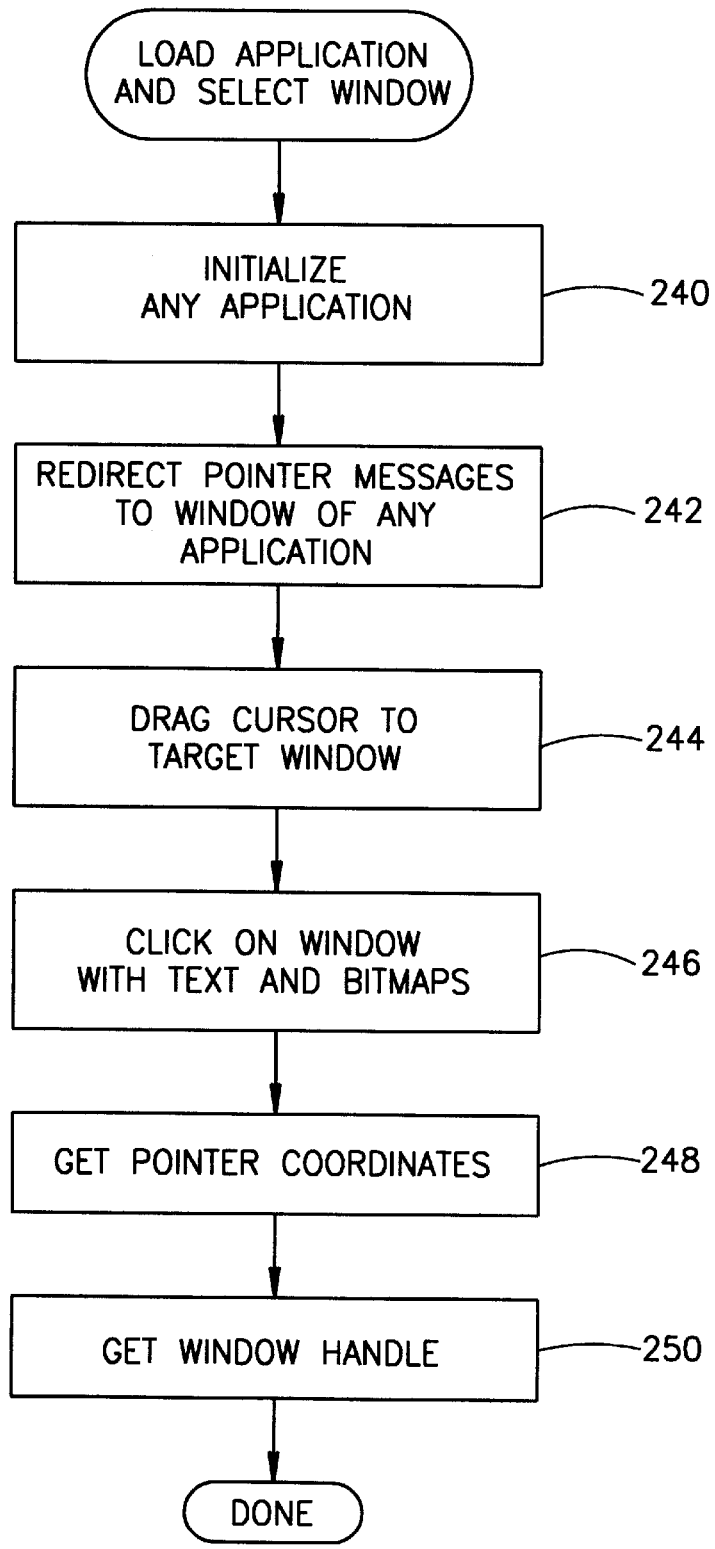
FIG. 6 is a high level flow diagram illustrating the method of selecting a window whose data is to be captured and retrieving its handle.

A high level flow diagram illustrating a preferred method of selecting a window whose data is to be captured and retrieving its handle is shown in FIG. 6. First the ANY application is initialized by clicking on an icon associated with ANY application and dragging and dropping it on a target window whose data is to be captured or acquired (step 240). The process of dropping the icon in the target window enables ANY application to retrieve the handle of that window. After the user clicks on the ANY application icon, a call is made to API function SetCapture which redirects all mouse or pointer input to the internal window of ANY application (step 242). The mouse is then dragged to the target window (step 244). After the click occurs while the mouse or pointer is in the target window (step 246), the coordinates of the pointer on the screen are determined (step 248). Using API function WindowFromPoint the handle of the window that contains the specified pointer of mouse point is retrieved (step 250).

Referring again to FIG. 5, all drawing to an application window is triggered by messages being sent to the window's procedure. In order to detect the transmission of messages to a window's procedure, the selected window's procedure is subclassed (step 224). Subclassing also allows the ANY application to know when the application's window procedure returns control to the OS. Subclassing is described in further detail in Petzold C., "Programming Windows 3.1," incorporated herein by reference. Once an application's window is subclassed, a subclassing procedure (callback function) residing in ANY DLL receives all the messages originally destined for the selected window's window procedure. Some of these messages can be controlled by the ANY application.

Interception is then installed to intercept text and bitmap functions, using the function hooking technique previously described (step 226). API function interception allows application ANY to receive all output destined to the screen from any arbitrary application, including Windows itself. Application ANY then forces the application associated with the selected window to redraw its window (step 228). The API function RedrawWindow is utilized in performing step 228, causing window message WM_PAINT to be sent to the application associated with the selected window. The Window's message WM_PAINT forces the application to redraw its window. Following the redrawing of the window, the text buffer is then formed (step 230).

Figure 7:
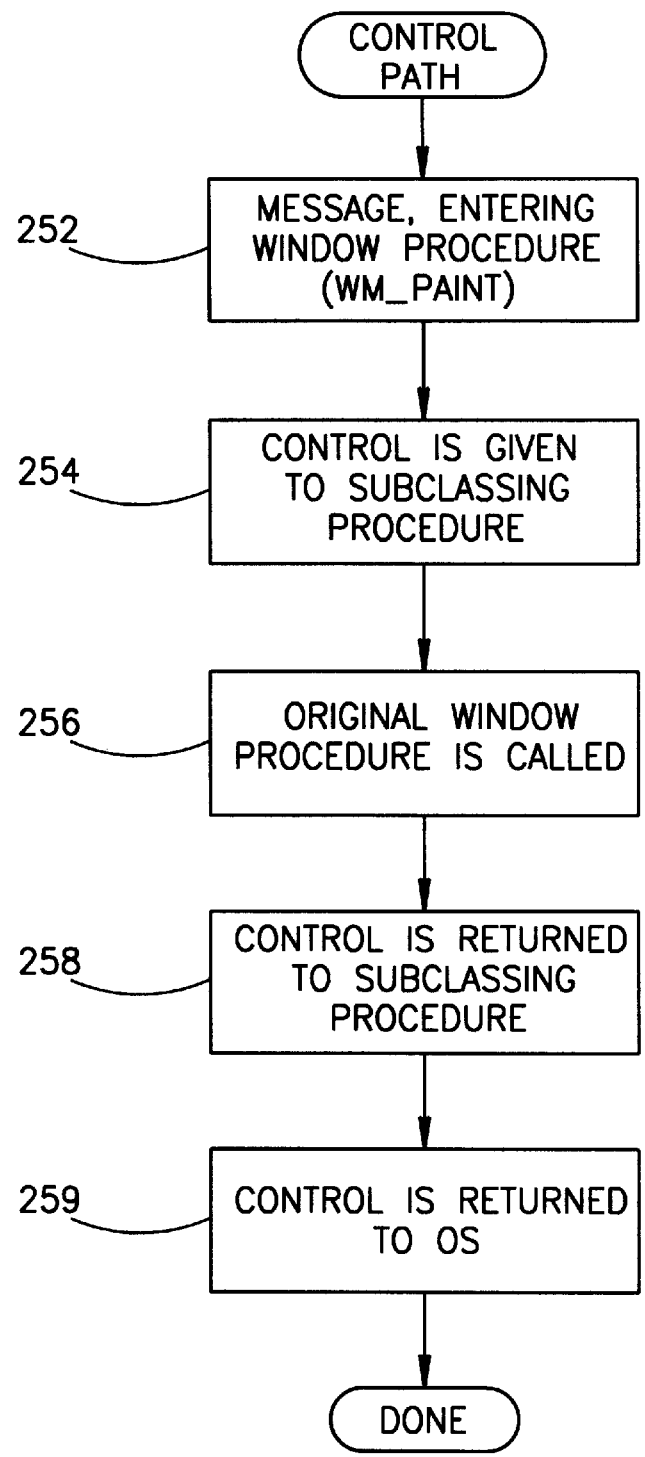
FIG. 7 is a high level flow diagram illustrating the message path in the window procedure of the selected window in the process of acquiring data.

The control path used in subclassing and function interception will now be described in more detail. With reference to FIG. 7, a Window message such as WM_PAINT enters subclassing callback function which resides in the ANY DLL (step 252). The ANY application then initializes its internal buffer and the message is passed to the original window procedure, using the API function CallWindowProc (step 254). The window procedure then processes the message (step 256). In the case of the message WM_PAINT, application 200 or 202 makes calls to API functions in order to draw text and bitmaps. These calls are intercepted and redirected to the callback function of the ANY DLL. Within the ANY DLL, the drawing data which is passed as parameters to the API functions is filtered and saved in an internal buffer of the ANY application. Control then returns to the subclassing procedure of ANY DLL (step 258). This serves as a notification to the ANY application that processing of the message has been completed. Control then returns to operating system (step 259).

Figure 8:
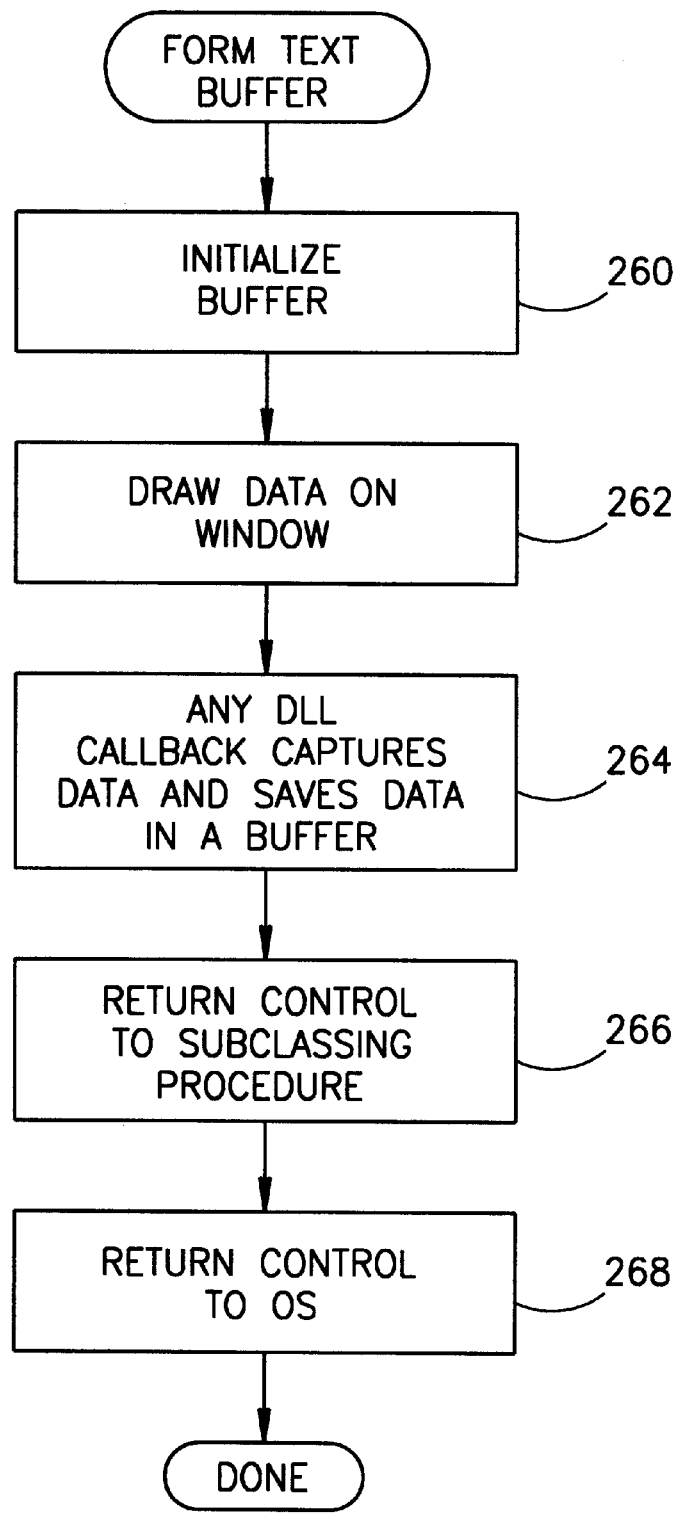
FIG. 8 is a high level flow diagram illustrating the method of forming a text buffer for holding data selected from an arbitrary application GUI window.

A high level flow diagram illustrating the method of forming buffer for holding data captured from an arbitrary application GUI window is shown in FIG. 8. As described previously, application 200 or 202 is forced by the message WM_PAINT to redraw its window. The message in the subclassing procedure leads to the buffer being initialized (step 260). The message is then transmitted to the original window procedure of application 200 or 202. In order to redraw its window, the application makes one or more calls to API functions, which are intercepted by ANY application (step 262). For text string data, the strings themselves and the coordinates of their starting position are the major parameters of the API functions. Other text attributes such as font, mapping mode, background color, text color etc. are retrieved from the device context (DC) structure handle which is always included as one of the parameters. In order to determine the coordinates of all the characters within strings, the font and the mapping mode are determined with the aid of API functions SelectObject and GetMapMode. Subsequently, the horizontal and vertical coordinates of all the characters within the string are determined using the API function GetTextExtent. Thus, the exact representation of the string, as it is displayed in the application's window, is placed within the ANY application internal buffer (step 264).

In a preferred embodiment, only the corner coordinates of bitmaps are retrieved. The bits making up a bitmap are copied from the screen after the coordinates of the rectangle surrounding the bitmap are determined. The method of copying bitmaps from the screen is described in the Microsoft Software Development Kit, incorporated herein by reference.

Redrawing occurs not only in the client rectangle of selected window but in other parts of the screen as well. The ANY application intercepts all calls to API functions thereby forcing incoming data to be filtered. Only data drawn in the selected window with the previously determined handle must be saved in the buffer. In a preferred embodiment the only parameter of the API functions from which the window handle can be retrieved is the device context. The device context is a link between an application's window and the screen drawing device (i.e., device driver). Geometrical considerations are taken into account in order to determine the window handle from the device context. The API function GetDCOrg is used to retrieve the coordinates of the upper left corner of the window client area. In order to get the handle of a window to which output is redirected the API function WindowFromPoint is utilized which provides the handle of the window on which drawing occurs. Comparing the handle of the selected window and the handle of the window to which output is directed allows the ANY application to place drawing data from the selected window in its buffer. Control is then returned to the subclassing procedure, thus, signaling to the ANY application that drawing has terminated (step 266). Control is then returned to the operating system (step 268).

Data processing in the present invention comprises selecting portions of text and bitmaps from the ANY application buffer. Subsequently, data thus marked or selected is routed to one or more output devices. In order to designate data for further utilization, the data is marked within the selected window.

In order to mark text within the selected window, the text which lies within a set of fixed coordinates, must be redrawn with a different background color so that a user can distinguish it from the non-marked text. In a preferred embodiment, line and block marking modes and also word marking using the mouse or pointer double click, are utilized to implement the text highlighting mechanism.

Figure 9:
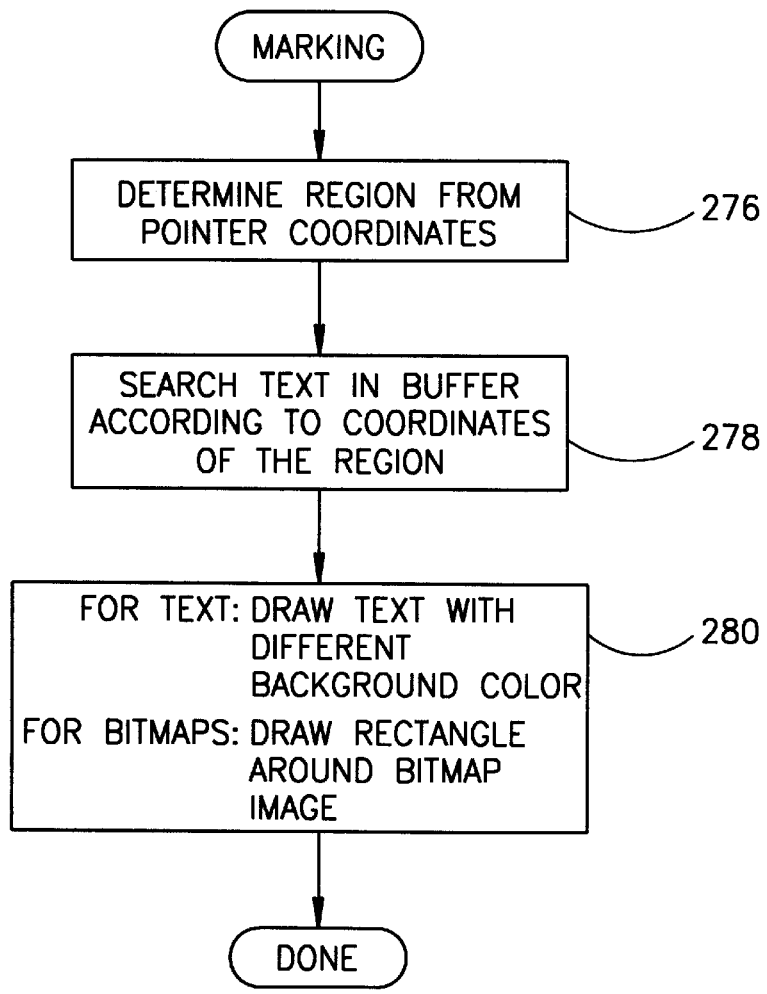
FIG. 9 is a high level flow diagram illustrating the method of highlighting text previously selected in a GUI window.

A high level flow diagram illustrating the method of marking or highlighting text in a previously selected GUI window is shown in FIG. 9. The selected window has been previously subclassed and pointer or mouse messages are handled in the subclassing procedure and are not allowed to enter the original windows procedure. Thus they do not control the behavior of application 200 or 202. The region marked by the user is determined from mouse or pointer coordinates (step 276). For text, the strings within the region, defined by the user selected coordinates, are found within the internal buffer of the ANY application (step 278). Interception hooks on the API functions are temporarily removed in order to avoid capturing strings again, causing an infinite situation. The string is then redrawn in the selected window using the API function ExtTextOut with a different background color. The background color is set using the API function SetBkColor, allowing text to appear marked on the screen. Bitmaps are marked by drawing a rectangle around the bitmap using the coordinates of the bitmap (step 280). Interception hooks are then reinstalled. The strings within the marked region are sent for further processing to one or more output devices.

Figure 10:
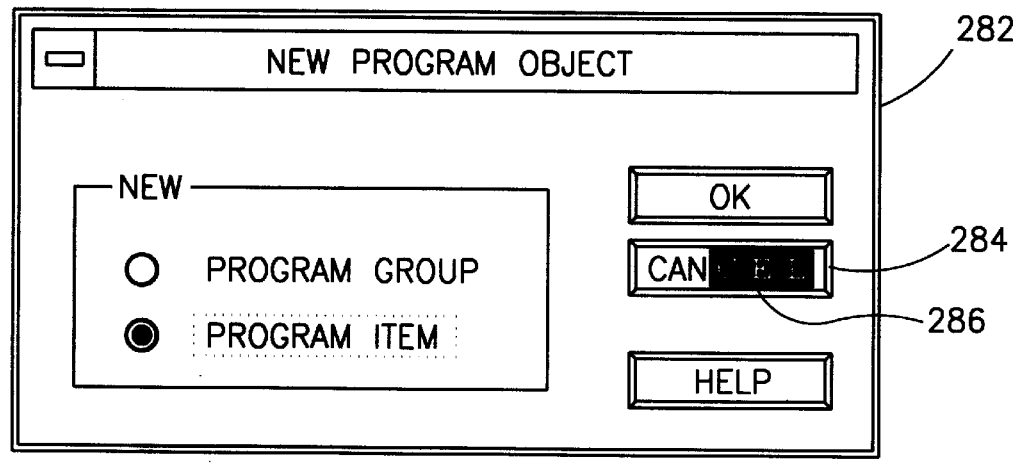
FIG. 10 illustrates the text marking of a portion of the text contained in an arbitrary application GUI window.

FIG. 10 illustrates the text marking of a portion of the text contained in an arbitrary application GUI window. In this example, Program Manager's dialog box (in Window's 3.1 and 3.11), corresponding to menu item 'File/New' is shown. The dialog box contains three buttons labeled 'OK,' 'Cancel' and 'Help.' These buttons are windows in themselves which do not normally support data transfer. Using the present invention, however, the text within the normally inaccessible 'Cancel' button can be marked and routed to a variety of output devices in accordance with a user's commands. For example, the marked text can be routed to another application such as a graphics utility, word processor, database management system, etc.

While the invention has been described with respect to a limited number of embodiments, it will be appreciated that many variations, modifications and other applications of the invention may be made.

What is claimed is:

1. A method in a computer system of acquiring, processing and routing text and/or bitmap data contained in a graphical user interface (GUI) window selected by a user, said graphical user interface window running under an operating system, the method comprising the computer implemented steps of:

acquiring said data from said GUI window selected by said user;

storing said acquired data in a data buffer;

processing said data in accordance with commands received from said user; and routing said processed data to at least one output device selected by said user.

wherein said step of acquiring comprises the steps of:

loading system application code and associated dynamic link libraries(DLL) into an area of memory of said operating system;

determining a window handle of said window selected by said user;

installing at least one hook on a window procedure associated with said GUI window selected by said user;

installing at least one application programming interface (API) hook on at least one native API function of said operating system;

forcing said GUI window selected by said user to be redrawn thereby causing all text and/or bitmap data within said selected window to be sent to said selected window; and filling a text buffer with said text and/or bitmap data sent to said selected window.

2. The method according to claim 1, wherein said step of filling a text buffer comprises:

forcing said selected window to redraw its contents;

initializing said text buffer to a known state;

utilizing said DLL to capture text and/or bitmap data redrawn to said selected window and saving it in said buffer;

returning control to said subclassed window procedure; and returning control to said operating system.

3. The method according to claim 2, wherein said step of utilizing said DLL to capture text and/or bitmap data comprises:

temporarily removing said at least one API hook;

copying data contained within the parameters of said API function to a temporary buffer;

calling said at least one native operating system API function so as to draw said text and/or bitmap data on said selected window; and reinstalling said at least one API hook.

means for filling a text buffer with text and/or bitmap data sent to said selected window.

4. A system for acquiring, processing and routing text and/or bitmap data contained in a graphical user interface (GUI) window selected by a user, said graphical user interface window running under an operating system, said system comprising:

means for acquiring said data from said GUI window selected by said user;

a data buffer for storing said acquired data;

a processor for processing said data in accordance with commands received from said user; and a router for routing said processed data to at least one output device selected by said user.

wherein said means for acquiring comprises:

means for loading system application code and associated dynamic link libraries (DLL) into an area of memory of said operating system;

means for determining a window handle of said window selected by said user;

means for installing at least one hook on a window procedure associated with said GUI window selected by said user;

means for installing at least one application programming interface (API) hook on at least one native API function of said operating system;

means for forcing said GUI window selected by said user to be redrawn thereby causing all text and/or bitmap data within said selected window to be sent to said selected window; and means for filling a text buffer with said text and/or bitmap data sent to said selected window.

5. The system according to claim 4, wherein said means for filling a text buffer comprises:

means for forcing said selected window to redraw its contents;

means for initializing said text buffer to a known state;

a DLL to capture text and/or bitmap data redrawn to said selected window and save it in said buffer;

means for returning control to said subclassed window procedure; and means for returning control to said operating system.

6. The system according to claim 5, wherein said DLL comprises:

means for temporarily removing said at least one API hook;

means for copying data contained within the parameters of said API function to a temporary buffer;

means for calling said at least one native operating system API function so as to draw said text and/or bitmap data on said selected window; and means for reinstalling said at least one API hook.

* * * * *